Feb. 14, 1956 — C. F. SCHANKE — 2,734,758
BEARING SEAL
Filed Nov. 20, 1952 — 5 Sheets-Sheet 1

INVENTOR.
Charles F. Schanke
BY
ATTORNEY

Feb. 14, 1956     C. F. SCHANKE     2,734,758
BEARING SEAL
Filed Nov. 20, 1952                           5 Sheets-Sheet 2

INVENTOR.
Charles F. Schanke
BY

ATTORNEY

Feb. 14, 1956  C. F. SCHANKE  2,734,758
BEARING SEAL
Filed Nov. 20, 1952  5 Sheets-Sheet 3

INVENTOR.
Charles F. Schanke
BY

ATTORNEY

Feb. 14, 1956

C. F. SCHANKE

2,734,758

BEARING SEAL

Filed Nov. 20, 1952

INVENTOR.
Charles F. Schanke
BY
ATTORNEY

Feb. 14, 1956 — C. F. SCHANKE — 2,734,758
BEARING SEAL

Filed Nov. 20, 1952

INVENTOR.
Charles F. Schanke
BY
ATTORNEY

United States Patent Office 2,734,758
Patented Feb. 14, 1956

2,734,758

BEARING SEAL

Charles F. Schanke, Indianapolis, Ind., assignor to Link-Belt Company, a corporation of Illinois Application November 20, 1952, Serial No. 321,578

20 Claims. (Cl. 286—5)

This invention relates to new and useful improvements in seals for bearings and deals more particularly with seals for anti-friction bearing units of the type which permits limited universal movement between the shaft and its bearing housing.

It is conventional practice to mount a self-alining type bearing unit in a solid or split housing with oil or grease seals, formed of one or more parts, arranged on opposite sides of the housing and extending between the housing and either the inner race ring of the bearing or the shaft supported by the bearing. Since self-alining bearings are designed to permit universal movement of their inner race rings about the mid-point of their axes when the shafts supported by the bearings are misalined, it will be readily apparent that the seal parts must permit limited radial movement of the rotating parts relative to the stationary housing.

In the past, this relative movement at the seals has been provided in some instances by the use of resilient seal members which were placed in rubbing engagement with a rotating member and were deformed or displaced by misalinement of the shaft. In other instances, labyrinth type seals have been employed with sufficient axial clearance provided between the relatively rotating seal parts to permit limited relative pivotal movement between the parts when the shaft was misalined. The absence of frictional engagement between the parts of the latter type seals is desirable to prevent heating and loss of power, but the effectiveness of such seals is necessaritly impaired by the excessive axial clearance that is required to permit relative movement between the seal parts.

It is the primary object of this invention to provide a novel form of self-alining, labyrinth type bearing seal.

Another important object of the invention is to provide an improved seal for self-alining bearings which includes rotatable and non-rotatable members forming a labyrinth for preventing the ingress of foreign matter and the egress of lubricant with both of the labyrinth forming members being movable in unison relative to the housing during the self-alining action of the bearing to prevent a substantial change in the axial alinement of the rotatable and non-rotatable members relative to each other.

Still another object of the invention is to provide an improved seal for self-alining bearings which will prevent the ingress of foreign matter and the egress of either oil or grease and which includes relatively rotatable parts that are always out of rubbing frictional engagement.

A further object of the invention is to provide a labyrinth type seal for self-alining bearings which includes rotatable and non-rotatable members having a minimum clearance therebetween and with the non-rotatable member being so mounted in the housing as to permit limited arcuate movement relative to the housing when the alinement of the bearing is changed for maintaining at all times axial alinement of the non-rotatable and the cooperating rotatable seal members.

A still futher object of the invention is to provide a self-alining, labyrinth type bearing seal adapted for use in connection with either a solid or a split bearing housing or with a cartridge type seal mounting ring.

Other objects and advantages of the invention will be apparent during the course of the following description.

In the accompanying drawings, forming a part of this specification and in which like reference characters are employed to designate like parts throughout the same.

Figure 1:
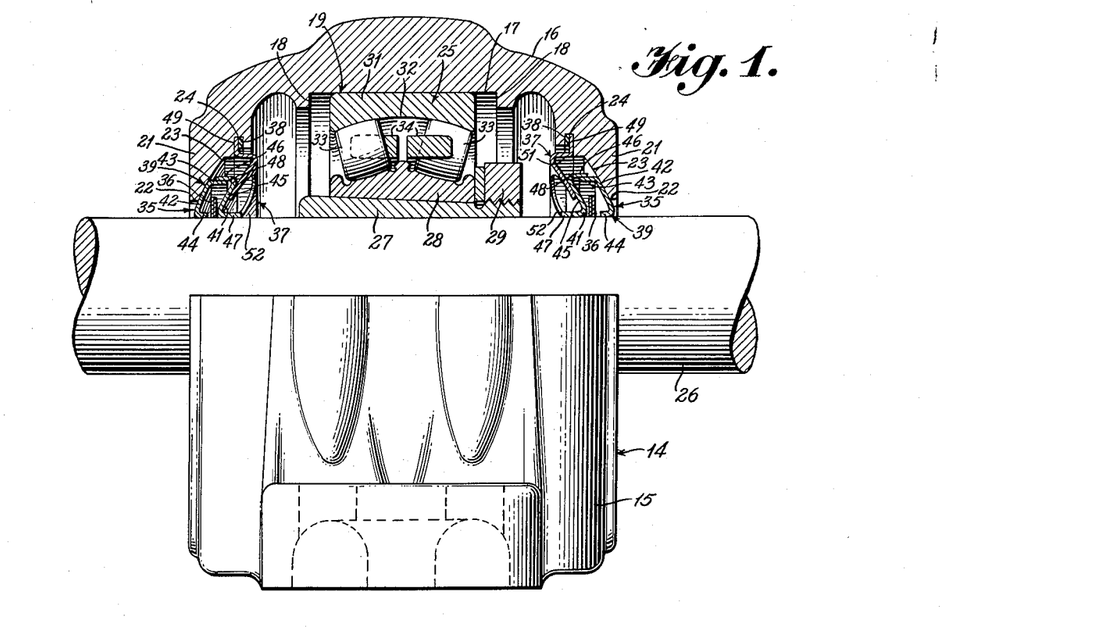
Figure 1 is a partly elevational and partly sectional view of a self-alining bearing mounted in a split housing and provided with seals embodying the invention.
Figure 2:
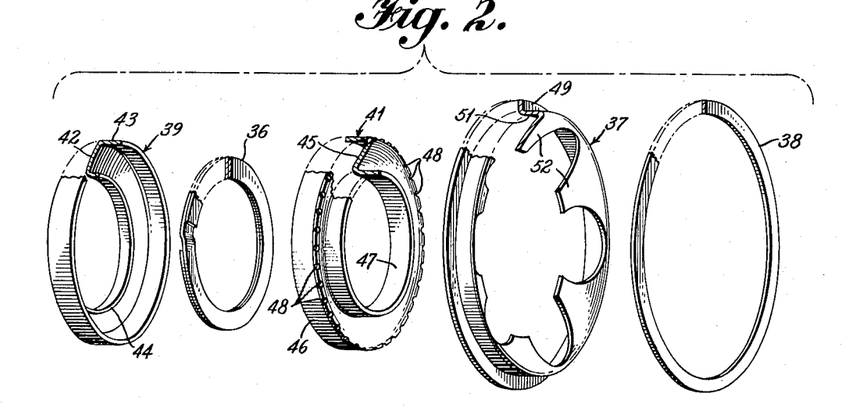
Figure 2 is an exploded view showing in perspective the elements of one of the seals illustrated in Fig. 1.

In the drawings, wherein are shown the preferred embodiments of this invention, and first particularly referring to Figs. 1 and 2, there is shown a split bearing housing 14 having a base 15 and a cap 16 which are securely fastened to each other in a conventional manner. It will be appreciated that the two-piece construction of the housing 14 is solely for convenience in assembling the bearing parts in the housing and that in all other respects the housing may be considered a unitary structure and will be so described. The interior of the housing 14 is chambered with its inner surfaces symmetrically formed about an axis lying in the plane of the engaging surfaces of the base 15 and cap 16.

The central portion of the housing 14 is formed with a cylindrical inner surface 17 having shoulders 18 at its edges to form a shallow bearing mounting groove 19. The side walls 21 of the housing 14 are spaced axially outwardly from the bearing mounting groove 19 and are provided with openings 22 in axial alinement with the bearing mounting groove. Adjacent the alined openings 22, the side walls 21 are each provided with an inwardly facing parti-spherical surface 23 which is centered at a point on the axis of the openings midway of the side walls. Axially inwardly of each parti-spherical surface 23 is an internal, circumferential groove 24 the sides of which are parallel and radially arranged.

The inner race ring 28 of a self-alining bearing unit 25 is rigidly mounted on the shaft 26 by means of a tapered bushing 27 which is tightened on the shaft by means of a threaded collar 29. The outer race ring of the bearing unit 25 is centrally positioned in the bearing mounting groove 19 of the housing 14 and is formed with a parti-spherical raceway 32 centered at the midpoint of its axis. Two sets of convex rollers 33 are positioned between the opposed raceways of the inner and outer race rings 28 and 31 and are maintained in circumferentially spaced relationship by cages 34 in a conventional manner. The diameter of the shaft 26 is less than that of the openings 22 so that the shaft will extend through the openings with sufficient clearance to permit self-alining movement of the shaft relative to the housing when the bearing unit is mounted in the housing. The self-alining movement of the shaft 26, however, is limited by engagement between the shaft and the edges of the openings 22 for a purpose that will be later described.

The above mentioned clearances between the openings 22 of the side walls 21 and the shaft 26 are each closed by a self-alining, labyrinth type seal assembly which consists of a sectional floating seal ring 35, a flinger ring 36, a spring finger ring 37 and a spacer washer 38, as illustrated in Fig. 2. The following detail description of one of the identical seal assemblies is believed to be sufficient for both.

The sectional floating seal ring 35 consists of an outer seal member 39 and an inner seal member 41, both of which are stamped, or otherwise formed, from thin metal stock. The outer seal member 39 is provided with a parti-spherical body portion 42 having its outer surface formed on a radius of curvature equal to that of the parti-spherical surface 23 of the side wall 21 and is adapted to engage the parti-spherical surface 23 when the floating seal ring 35 is properly positioned in the housing 14. Both edges of the outer seal member 39 are bent in the same axial direction to form an outer assembly flange 43 and an inner sealing flange 44. The inner diameter of the sealing flange 44 is slightly greater than the diameter of the shaft 26 so that, when the seal ring 35 is positioned in the housing, the shaft will rotate freely in the opening of the outer seal member 39.

The inner seal member 41 is provided with a body portion 45 which is preferably parti-spherical in shape with a smaller radius of curvature than that of the body portion 42 but with substantially the same radial dimensions. It will be appreciated, however, that the body portion 45 may be formed as a frustum of a cone without detracting from its efficient functioning, as will be later described. At the edges of its body portion 45, the inner seal member is bent axially in opposite directions to form an outer assembly flange 46 and an inner sealing flange 47. The inner diameter of the assembly flange 46 and the outer diameter of the assembly flange 43 are of proper relative dimensions to provide a tight fit when telescoped together. The inner diameter of the sealing flange 47 is slightly greater than the outer diameter of the shaft 26. At circumferentially spaced intervals along the juncture of the assembly flange 46 and the body portion 45 are a plurality of drain holes 48 which extend in a generally radial direction.

The flinger ring 36 is formed from a continuous flat strip of relatively stiff material which is spirally wound through approximately two coils or turns. The flinger ring 36 is formed with its inside diameter less than that of the shaft 26 so that when the ring is placed on the shaft it will be uncoiled slightly and will be clamped to the shaft by its tendency to return to its original shape. The tendency of the flinger ring 36 to return to its original shape must be sufficient to overcome the action of centrifugal force when the shaft 26 is rotated.

The flinger ring 36 is assembled between inner and outer seal members 41 and 39, respectively, when said members are press-fitted together. It will be noted that the free edge of the assembly flange 43 is not seated against the body portion 45 of the inner seal member 41 so that the drain holes 48 are in open communication with the space between the inner and outer seal members.

The spring finger ring 37 is stamped, or otherwise formed, from thin metal stock, or other similar resilient material, so as to provide an outer mounting flange 49 which is radially arranged, an intermediate, axially extending body portion or shoulder 51, and a plurality of circumferentially spaced spring fingers 52. These fingers are bent at an acute angle relative to the shoulder and are preferably arcuate in radial cross section with a radius of curvature approximately equal to that of the body portion 45 of the inner seal member 41. The arcuate cross section of the fingers 52, however, is not essential to the proper functioning of the spring ring and the fingers may be formed of a portion bent into a frustum of a cone.

The spacer washer 38 is stamped, or otherwise formed, from metal stock having a thickness which when combined with the thickness of the mounting flange 49 of the spring ring 37 will substantially equal the width of the groove 24.

To effect assembly of the structure illustrated in Fig. 1, the self-alining bearing 25 as a unit and the several elements of the two labyrinth seals are threaded onto the shaft 26 in the most practical manner and sequence, which will depend on the overall length of the shaft, the position the bearing will occupy relative to the respective ends of the shaft, the location of associate machinery parts, and the like. After being assembled on the shaft, the bearing unit 25 should be fastened to the shaft in the desired location and the elements of the two seal assemblies should be properly positioned relative to the bearing unit so that the base portion 15 of the housing 14 and the shaft with its bearing unit and seal assemblies may be placed in final operative relationship with each other. The cap portion 16 of the bearing housing then should be applied an the housing portions bolted together.

After the above described assembly has been completed, any misalinement of the shaft is compensated for by axial movement of the rollers 33 relative to the parti-spherical surface of the raceway. This self-alining action of the bearing unit 25, therefore, permits relative movement between the shaft and housing about a point on the axis of rotation of the shaft located midway between the side walls 21 of the housing. This relative movement is limited by engagement between the walls of the openings 22 and the shaft 26 to prevent damage to the seal assemblies but is adequate to compensate for any misalinement on the shaft which might be normally encountered.

As the shaft 26 is misalined, the engaging partispherical surfaces of the side walls 21 of the housing and the body portions 39 of the outer seal members are moved relative to each other while being maintained in tight sealing engagement by the action of the spring fingers 52 of the rings 37. The relative movement between the parti-spherical surfaces is brought about by temporary contact between the surface of the shaft 26 and points on the inner surfaces of the sealing flanges 44 and 47 of the floating seal rings 35. As soon as the relative movement between the shaft 26 and housing 14 has stopped, however, this contact with the flanges 44 and 47 will be broken by the natural vibration of the rotating parts and by the wedging of air or lubricant between the contacting surfaces. The shaft 26 will thereupon rotate freely in the openings of the floating seal rings 35 as will the flinger rings 36 which are clamped on the shaft.

Any grease or lubricant which is introduced to the chambered interior of the housing 14 will be prevented from escaping through the openings 22 and dirt will be prevented from entering the interior of the housing by the combined action of various parts of the seal assemblies. The parti-spherical surfaces of the outer seal members 39 and the side walls 21 will be maintained in sealing engagement at all times by the spring fingers 52 as described above. The proximity of the opposed surfaces of the sealing flanges 44 and the shaft 26 will prevent the ingress of dirt and other foreign matter into the interior of the floating seal ring 35. The proximity of the opposed surfaces of the sealing flanges 47 and the shaft 26 will substantially prevent the egress of lubricant from the interior of the housing into the interiors of the floating seal rings 35, and any lubricant that escapes past the sealing flanges 47 will encounter the flinger rings 36 and be thrown radially outwardly by the centrifugal force or flinging action of the flinger rings. This lubricant which is thrown radially outwardly will be caught within the floating seal rings 35 and will drain back into the chambered interior of the housing through the drain holes 48 in the inner seal members 41.

Figure 3:
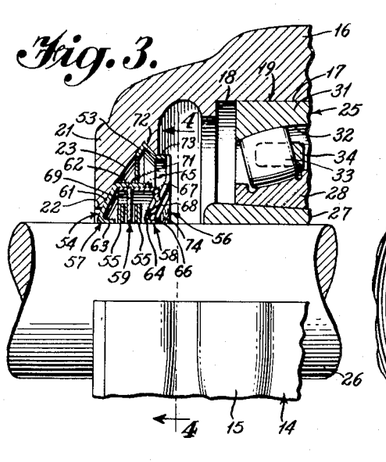
Figure 3 is a fragmentary view, partly in section, of a modified seal embodying the invention and used in connection with the type of bearing and housing illustrated in Fig. 1.
Figure 4:
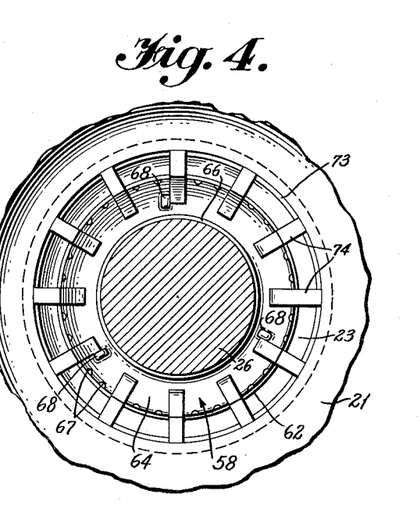
Figure 4 is a sectional view taken on line 4—4 of Fig. 3.
Figure 5:
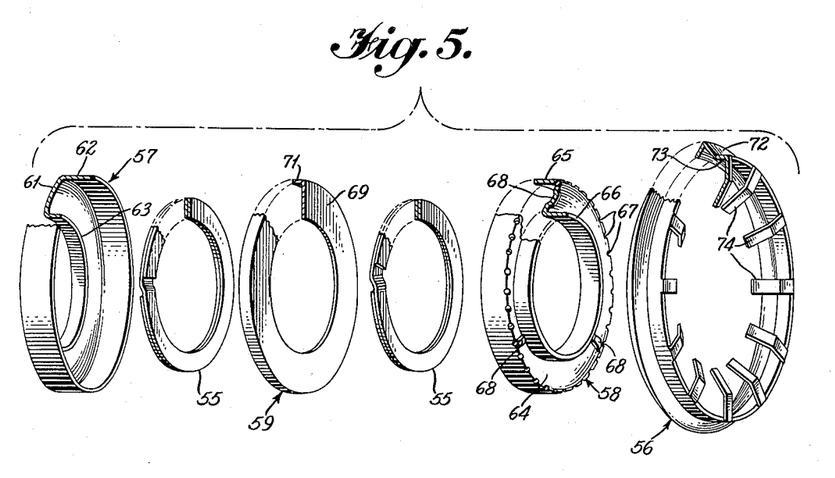
Figure 5 is an exploded view showing in perspective the elements of the seal illustrated in Fig. 3.

Referring now to the modification of the invention illustrated in Figs. 3 to 5, inclusive, it will be seen that the form and arrangement of the bearing unit and housing are identical to those illustrated in Figs. 1 and 2 and the same reference characters have been applied to corresponding parts of each. The seal assemblies and the groove for mounting the spring ring have been modified, however, and will be described in detail as follows:

Adjacent the outer edge of the parti-spherical surface 23 of each side wall 21 of the housing is a continuous, circumferentially extending groove 53 which opens inwardly and the side walls of which provide opposed conical surfaces converging at the bottom of the groove.

Associated with each side wall 21 of the housing, to close the space between its opening 22 and the shaft 26, is a seal assembly consisting of a floating seal ring 54, a pair of flinger rings 55 and a spring finger ring 56. The seal assemblies associated with the two side walls 21 are identical and the following description of one is believed to be sufficient for both.

The floating seal ring 54 is formed from an outer seal member 57, an inner seal member 58 and a partition member 59, all of which are stamped, or otherwise formed, from thin metal stock. The outer seal member 57 is provided with a parti-spherical body portion 61 having its outer surface formed with a radius of curvature equal to that of the parti-spherical surface 23 of the side wall 21 and adapted to be placed in engagement with the latter surface when the floating seal ring 54 is positioned in the housing 14. The edges of the outer seal member 57 are bent in the same axial direction at the edges of the parti-spherical body portion 61 to form an outer assembly flange 62 and an inner sealing flange 63. The inner diameter of the sealing flange 63 is slightly greater than the diameter of the shaft 26 so that, when the outer seal member 57 is in position, the shaft will rotate freely in the opening of the seal member.

The inner seal member 58 is provided with a body portion 64 which is preferably parti-spherical in shape with a smaller radius of curvature than that of the body portion 61 of the outer seal member 57 but with substantially the same radial dimensions relative to its axis. The body portion 64, however, may be formed as a frustum of a cone without detracting from the efficient functioning of the member as will be later described. The inner seal member 58 is bent axially in opposite directions at the edges of the body portion 64 to form an outer assembly flange 65 and an inner sealing flange 66. The outer diameter of the assembly flange 65 and the inner diameter of the assembly flange 62 are of proper relative dimensions to provide a tight fit when telescoped together. The inner diameter of the sealing flange 66 is slightly greater than the diameter of the shaft 26. At circumferentially spaced intervals along the juncture of the assembly flange 65 and the body portion 64 are a plurality of drain holes 67 which extend in a generally radial direction. At three equally, circumferentially spaced points, a small section of the body portion 64 is axially displaced to provide a lug 68 for a purpose that will be later described.

The partition member 59 is formed with a radially arranged body portion 69 having an axially extending assembly flange 71 at its outer edge. The outer diameter of the assembly flange 71 is slightly greater than the inner diameter of the assembly flange 62 and the inner diameter of the body portion 69 is slightly greater than the diameter of the shaft 26.

The flinger rings 55 are identical to those illustrated in Figs. 1 and 2 and are assembled with the floating seal ring 54 as follows: One of the flinger rings 55 is positioned within the outer seal member 57 and the assembly flange 71 of the partition member 59 is press fitted into the assembly flange 62 of the outer seal member. The second flinger ring 55 is then positioned in the outer seal member 57 on the opposite side of the partition 59 from the first flinger ring and the assembly flange 65 of the inner seal member 58 is press fitted into the assembly flange 62 of the outer seal member to complete the assembly.

The spring finger ring 56 is stamped, or otherwise formed, from thin metal stock or from other similarly resilient material so as to provide a mounting flange or bead 72 having outwardly diverging portions adapted to be seated in the groove 53 of the housing wall 21. Adjacent the mounting flange 72, the spring ring 56 is bent axially to provide a shoulder 73. Spaced circumferentially around the edge of the shoulder 73 are a plurality of spring fingers 74 which are bent radially inwardly and the inner ends of which are further bent to substantially the same angle with the axis of the spring ring as the angle between the body portion 64 of the inner seal member 58 and its axis.

The structure of Fig. 3 is assembled in the same most practical manner and sequence as pointed out above in connection with the structure of Fig. 1.

The converging surfaces of the mounting flanges 72 of the spring rings 56 and the similarly formed surfaces of the grooves 53 facilitate the assembly of the housing parts and permit the spring fingers 74 to be forced into tight engagement with the body portions 64 of the inner seal members 58 when the housing is assembled. Further, the engagement between the spring fingers 74 and the projecting lugs 68 of the body portion 64 provides a positive stop to prevent rotation of the floating seal member.

Sealing between the seal assemblies and the shaft 26 is provided by the proximity of the inner surfaces of the sealing flanges 63 and 66 and the partition members 59 to the shaft and by the action of the flinger rings 55. The proximity of the flange 63 to the shaft 26 will prevent the ingress of dirt or other foreign matter into the interior of the floating seal ring 54 and the proximity of the flange 66 to the shaft will substantially prevent the escape of lubricant from the interior of the housing. Some lubricant, however, may flow along the shaft past the flange 66 to the flinger ring 55 where it will be thrown radially outwardly by the centrifugal force or flinging action of the flinger ring. This lubricant which is thrown radially outwardly by the flinger ring 55 will be trapped between the partition member 59 and the inner seal member 58 and will drain back into the chambered interior of the housing 14 through the drain holes 67 in the inner seal member. The space between the partition member 59 and the outer seal member 57 and the flinger ring 55 positioned in this space provide an additional safeguard whereby any lubricant which escapes outwardly past the partition member or any dirt or foreign matter which passes between the sealing flange 63 and shaft 26 will be trapped against further axial movement.

Figure 6:
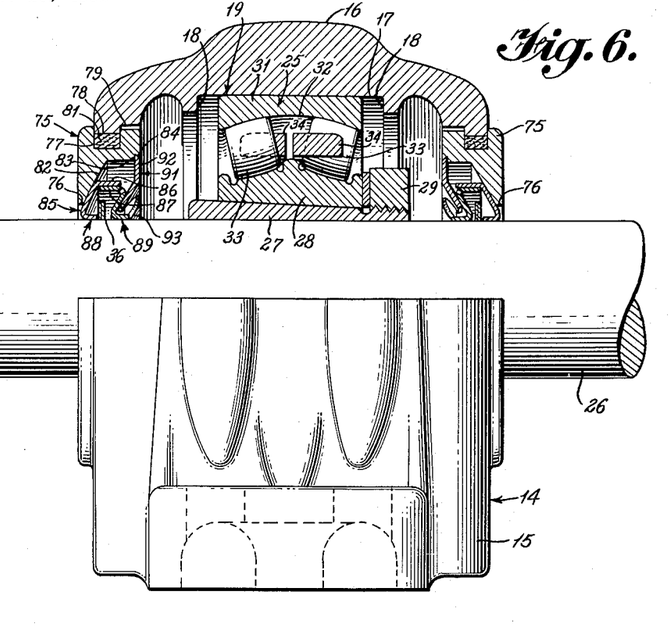
Figure 6 is a partly elevational and partly sectional view of a self-alining bearing, mounted in a split housing with removable side walls in which are mounted seals embodying a further modification of the invention.
Figure 7:
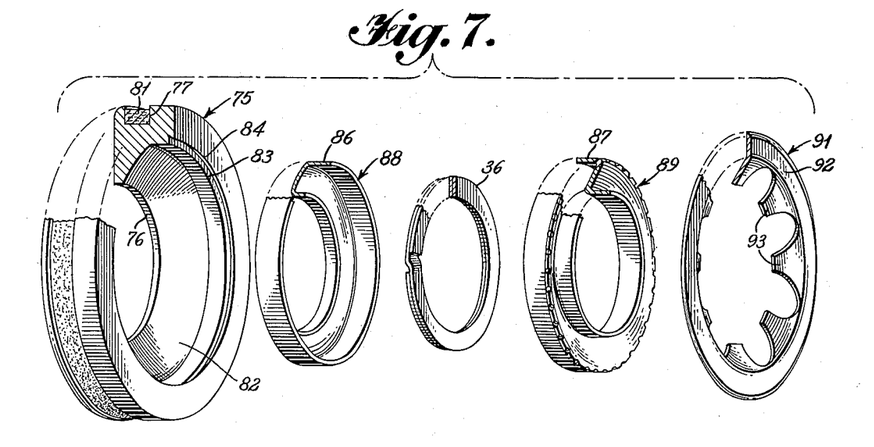
Figure 7 is an exploded view showing in perspective the elements of one of the seals illustrated in Fig. 6.

Referring now to the modification of the invention illustrated in Figs. 6 and 7, it will be seen that the bearing unit, housing and seal assembly are, in many respects identical to those illustrated in Figs. 1 and 2. The same reference characters have been applied to the corresponding parts of each and only the modified portions of the structure illustrated in Figs. 6 and 7 will be described in detail.

The housing 14 is provided with removable side walls 75 which are mounted on opposite sides of the housing and provide openings 76 for receiving the shaft 26. The two side walls 75 are identical and the following description of one will suffice for both. The side wall 75 is preferably of annular shape and is provided with a peripheral groove 77 for receiving the flange 78 of the opening 79 in the housing 14. The side wall 75 is thereby maintained in a fixed position relative to the housing 14 and sealing between the engaging surfaces of the side wall and housing is provided by a compressible gasket ring 81 positioned in the groove 77 for engagement with the inner surface of the flange 78. The removable side wall 75 has formed therein a parti-spherical surface 82 which has its center located at a point midway between the two side walls on the axis of their alined openings.

Spaced axially from the outer edge of the parti-spherical surface 82, the side wall 75 is provided with a circumferentially extending groove 83 which is initially formed with an axially extending lip 84, as illustrated in Fig. 7.

The floating seal ring 85 is identical to that illustrated in Figs. 1 and 2 with the single exception that the radial dimensions of the assembly flanges 86 and 87 of its outer and inner seal members 88 and 89, respectively, are reversed so that flange 87 will fit within the assembly flange 86.

The spring finger ring 91 is stamped, or similarly formed from thin metal stock so as to provide a radially arranged mounting margin 92, the outer edge of which is beveled for cooperation with the lip 84 as will be later described. Spring fingers 93 are arcuately or angularly arranged relative to the mounting margin 92 as was previously described in connection with the modification of the invention illustrated in Figs. 1 and 2.

Each removable side wall 75 and its associated seal parts are assembled prior to the mounting of the side wall in the housing 14. The flinger ring 36 is positioned between the inner and outer seal members 88 and 89, respectively, and the assembly flanges 86 and 87 of the seal members are press fitted into overlapped relationship to form the floating seal ring 85. The floating seal ring 85 with the flinger ring 86 positioned therein is then placed with the parti-spherical surface of the outer seal member 88 in engagement with the parti-spherical surface 82 of the removable side wall 75. The spring finger ring 91 is positioned with the beveled edge of its mounting margin 92 in the groove 83 and the lip 84 of the groove is swaged or otherwise compressed into engagement with the beveled edge. The ring 91 is thereby rigidly mounted in the removable side wall 75 with its spring fingers 93 engaging the inner seal member 89 to maintain sealing engagement between the parti-spherical surfaces of the outer seal member 88 and side wall 75.

The removable side walls 75 with the seal assemblies mounted therein are then fitted over the ends of the shaft 26 on opposite sides of the bearing unit 25 and moved axially along the shaft to points which are slightly closer to the bearing unit than the positions which they will ultimately occupy. The side walls 75 are thereafter moved away from the bearing unit 25 into their proper positions at which time the flinger ring 36 is substantially centered between the sealing flange of the outer seal member 88 and the body portion of the inner seal member 89. The shaft 26, bearing unit 25 and removable side walls 75 are then positioned in the base 15 of the housing with the bearing unit centered in the bearing mounting groove 19 and with the peripheral groove 77 of each side wall engaging the shoulder 78 in the base of the housing. The cap 16 of the housing is thereafter positioned on the base 15 and suitably connected thereto to complete the assembly of the entire unit.

The self-alining and sealing actions of the modification of the invention illustrated in Figs. 6 and 7 are identical to those of the seal assembly illustrated in Figs. 1 and 2 and will not again be described. It will be noted, however, that the removability of the side walls 75 makes possible a standardization of housing structures which are adapted for various types and sizes of seal structures to thereby permit a substantial reduction in the inventory necessary for special and standard bearing requirements.

Figure 8:
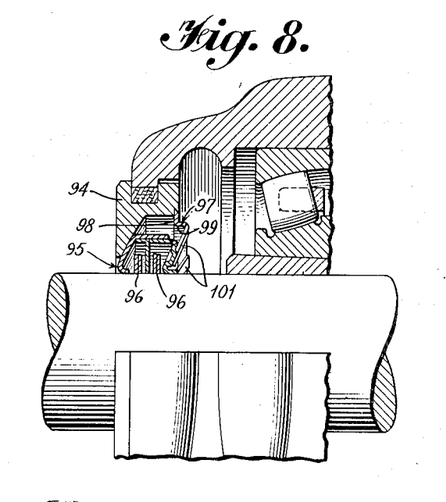
Figure 8 is a fragmentary view, partly in section, of a further modified seal embodying the invention and used in connection with the type of bearing and housing illustrated in Fig. 6.
Figures 9, 12:
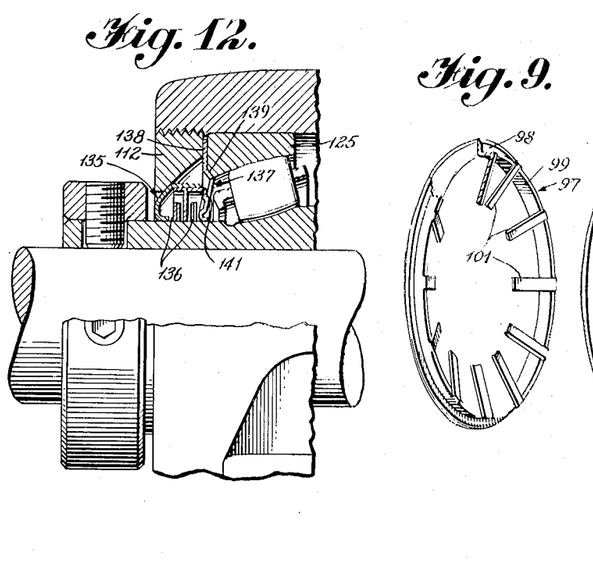
Figure 9 is a perspective view of the spring finger ring illustrated in Fig. 8.
Figure 12 is a fragmentary view, partly in section, of a further modified seal embodying the invention and used in connection with the type of bearing and housing illustrated in Fig. 10.

The modification of the invention illustrated in Figs. 8 and 9 incorporates a removable side wall 94 which is identical to that illustrated in Figs. 6 and 7. Associated with the removable side wall 94 for cooperation therewith is a floating seal ring 95 and flinger rings 96 identical to those illustrated in Figs. 3 to 5, inclusive. The floating seal ring 95 is urged into engagement with the parti-spherical surface of the removable side wall 94 by the spring finger ring 97 which is best illustrated in Fig. 9 as being stamped, or otherwise formed, from thin metal stock so as to provide an outer mounting flange 98 having a beveled peripheral edge. At the inner edge of the mounting flange 98, the spring ring 97 is bent axially to provide a shoulder 99. Spaced circumferentially around the outer edge of the shoulder 99 are a plurality of spring fingers 101 which are bent to extend inwardly at an acute angle relative to the shoulder.

Assembly of the floating seal ring 95 and the flinger rings 96 is identical to that of the modification of the invention illustrated in Figs. 3 to 5, inclusive, and the mounting of the spring ring 97 in the removable wall 94 is identical to that of the modification of the invention illustrated in Figs. 6 and 7. The description of the self-alining action and the sealing action of the seal assembly illustrated in Figs. 3 to 5, inclusive, and the manner in which the fingers 101 cooperate with the projections on the inner member of the floating seal ring presented in connection with the modification of the invention illustrated in Figs. 3 to 5, therefore, is equally applicable to the modification illustrated in Figs. 8 and 9 and will not be repeated. The mounting of the removable side wall 94 and the seal assembly are the same as was described in connection with Figs. 6 and 7 and will also be omitted at this time.

Figure 10:
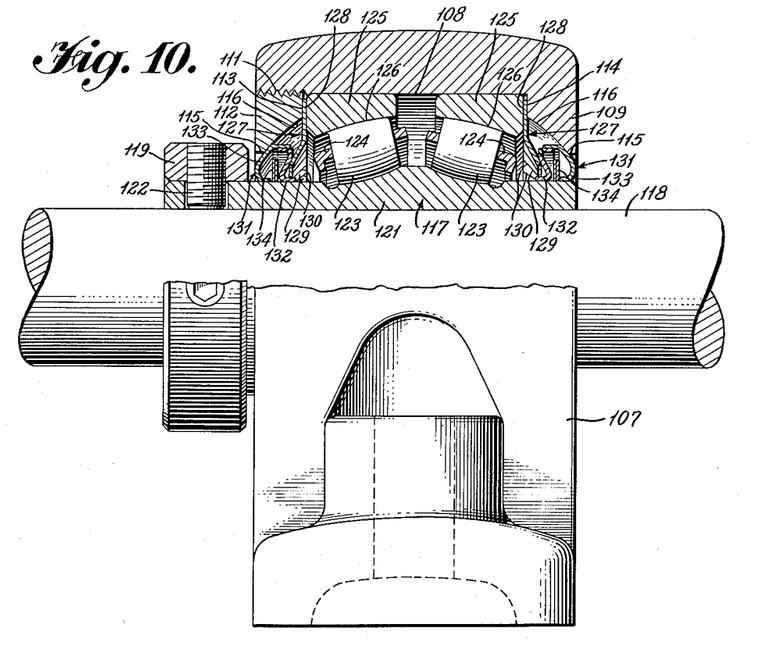
Figure 10 is a partly elevational and partly sectional view of a self-alining bearing mounted in a solid housing and provided with seals embodying a still further modification of the invention.
Figure 11:
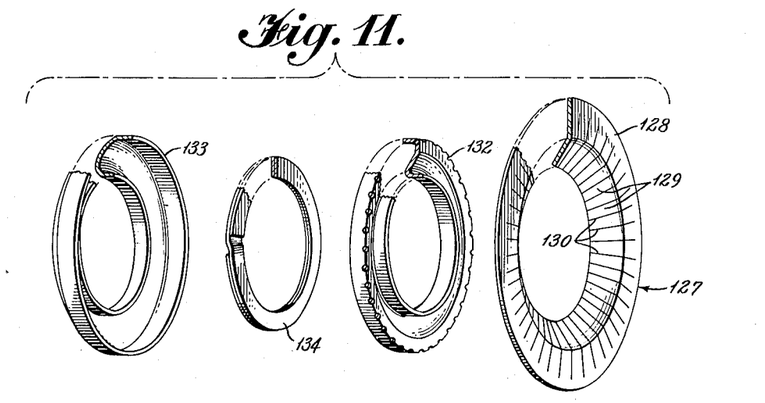
Figure 11 is an exploded view showing in perspective the elements of one of the seals illustrated in Fig. 10.

Referring now to the modification of the invention illustrated in Figs. 10 and 11, the housing 107 is of solid construction and is provided with a cylindrical bore 108, one end portion of which terminates at the integral side wall 109. The other end of the cylindrical bore 108 is threaded at 111 to receive a removable side wall 112. When positioned in the housing 107, the removable side wall 112 provides a shoulder 113 at one end of the cylindrical bore 108 and the integral side wall 109 provides a similar shoulder 114 at the other end of the bore. The side walls 109 and 112 are provided with alined openings 115 which are concentric with the cylindrical bore. Adjacent the alined openings 115, the side walls 109 and 112 are each provided with an inwardly facing parti-spherical surface 116 which has its center located at a point midway between the side walls and on the axis of the openings.

A self-alining type bearing unit 117 is rigidly mounted on the shaft 118 by means of a collar 119 which is positioned on the extended end portion of the inner race ring 121 of the bearing unit. Threadedly mounted on the collar 119 and extending radially through the alined opening in the inner race ring 121 for engagement with the shaft 118 is a set screw 122 which clamps the inner race ring to the shaft 118. Two circumferential rows of convex rollers 123 are positioned on the inner race ring 121 and are maintained in properly spaced relationship by cages 124 in a conventional manner. A pair of outer race rings 125, having parti-spherical raceways 126, are positioned for engagement with the two rows of rollers 123 so that the bearing unit 117 will permit self-alining movement of the shaft 118 by movement of the rollers axially of the parti-spherical raceways 126.

When the outer race rings 125 are properly positioned on the rollers 123, the inner race ring 121 extends axially beyond the outer race rings. Properly associated with each axially extending portion of the inner race ring 121 is a spring finger ring 127 which is stamped or similarly formed from thin metal stock. Each of the spring rings 127 is formed with a radially arranged marginal mounting portion 128 having a plurality of spring fingers 129 extending radially inwardly therefrom and formed by the slits 130. The inner ends of the fingers 129 are bent laterally for a purpose that will be later described.

Mounted axially outwardly of each spring ring 127 is a floating seal ring 131 having inner and outer seal members 132 and 133, respectively, and a flinger ring 134, all of which are formed and assembled in a manner identical to that of the floating seal ring 85 and flinger ring 86 of the modification of the invention illustrated in Figs. 6 and 7. It will be appreciated that the spring ring 127, floating seal ring 131, flinger ring 134 and removable side wall 112 adjacent the collar 119 must be assembled before the collar 119 is positioned on the inner race ring 121.

With the bearing parts and the seal parts assembled as described, the shaft is properly positioned in the housing with the cooperating parti-spherical surfaces of the floating seal ring 131 and integral side wall 109 in sealing engagement. At this time, the mounting margin 128 of the spring ring 127 will be rigidly clamped between the shoulder 114 and the adjacent outer race ring 125 so that the spring fingers 129 will maintain the sealing engagement between the aforesaid parti-spherical surfaces. The removable side wall 112 is then threaded into the housing to clamp the marginal portion of the associated spring ring 127 between its shoulder 113 and the adjacent outer race ring 125 whereby the spring fingers 129 will maintain the parti-spherical surface 116 of the removable side wall and that of the associated floating seal ring 131 in sealing engagement.

The self-aligning and sealing actions of this seal assembly are identical to those described in connection with the modification of the invention illustrated in Figs. 1 and 2 and will not again be described.

Figure 13:
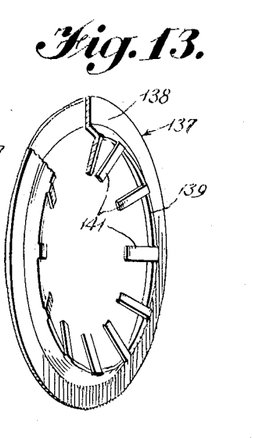
Figure 13 is a perspective view of the spring finger ring illustrated in Fig. 12.

The modification of the invention illustrated in Figs. 12 and 13 is similar to that illustrated in Figs. 10 and 11 but incorporates the partitioned floating seal rings 135 and double flinger rings 136 identical to those described in connection with Figs. 3 to 5, inclusive, and provides modified spring rings 137 to accommodate the greater width of the floating seal rings 135. A detail description of one of the modified spring rings 137 follows:

The marginal mounting portion 138 of the spring ring 137 is radially arranged and adapted to be clamped between the removable end wall 112 and the outer race ring 125. Adjacent the mounting margin 138, the spring ring 137 is laterally inclined to provide a shoulder 139 which conforms in shape with the beveled inner edge of the raceway 125. At circumferentially spaced intervals around the inner edge of the shoulder 139 are a plurality of spring fingers 141 which are so formed as to yieldably engage the floating seal ring 135 to urge the associated parti-spherical surfaces of the floating seal ring and side wall 112 into sealing engagement.

The self-alining and sealing actions of the modification of the invention illustrated in Figs. 12 and 13 are identical to those of the seal illustrated in Figs. 3 to 5, inclusive, and the assembly of the bearing, housing and seal parts is identical to that of the modification of the invention illustrated in Figs. 10 and 11. Therefore, no further description is believed to be necessary.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a floating seal ring having a parti-spherical surface engaging said parti-spherical face and having an internal surface in closely spaced relation to the outer surface of said other member for free rotation of the latter relative to said floating seal ring, resilient means for maintaining the aforesaid parti-spherical surfaces in engagement, and a flinger ring mounted on said other member in labyrinth sealing relation to said floating seal ring.

2. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a floating seal ring having a parti-spherical surface engaging said parti-spherical face and having a circumferential channel opening in closely spaced relation to the outer surface of said other member for free rotation of the latter relative to said floating seal ring, resilient means for maintaining the aforesaid parti-spherical surfaces in engagement, and a flinger ring mounted on said other member and extending into said channel in labyrinth sealing relation to said floating seal ring.

3. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a sectional floating seal ring having a parti-spherical surface engaging said parti-spherical face and having its sections arranged to form a circumferential channel therebetween opening in closely spaced relation to the outer surface of said other member for free rotation of the latter relative to said floating seal ring, resilient means for maintaining the aforesaid parti-spherical surfaces in engagement, and a flinger ring mounted on said other member and extending into said channel in labyrinth sealing relation to said floating seal ring.

4. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a sectional floating seal ring having axially spaced wall portions connected at their peripheries, one of said wall portions having a parti-spherical surface engaging said parti-spherical face and each wall portion having a surface in closely spaced relation to the outer surface of said other member for free rotation of the latter relative to said floating seal ring, said seal ring having a plurality of circumferentially spaced passageways extending generally radially outwardly from the space between its wall portions, resilient means engaging said seal ring for maintaining the aforesaid parti-spherical surfaces in engagement, and a flinger ring mounted on said other member and extending into the space between said wall portions in labyrinth sealing relation to said floating seal ring.

5. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a sectional floating seal ring formed with an outer and an inner seal member, said seal members having axially spaced wall portions and oppositely arranged peripheral flanges extending into overlapped relationship for connecting the seal members, said outer seal member having a parti-spherical surface engaging said parti-spherical face and both of said seal members having axially inwardly flanged central openings with the radially inner surfaces of the flanges in closely spaced relation to the outer surface of said other member for free rotation of the latter relative to said floating seal ring, said inner seal member having a plurality of circumferentially spaced passageways extending generally radially outwardly from the space between said wall portions, resilient means engaging said inner seal member for maintaining the aforesaid parti-spherical surfaces in engagement, and a flinger ring mounted on said other member and extending into the space between said wall portions in labyrinth sealing relation to said floating seal ring.

6. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a sectional floating seal ring formed with an outer and an inner seal member, said seal members having axially spaced wall portions and oppositely arranged peripheral flanges extending into overlapped relationship for connecting the seal members, said outer seal member having a parti-spherical surface engaging said parti-spherical face and both of said seal members having axially inwardly flanged central openings with the radially inner surfaces of the flanges in closely spaced relation to the outer surface of said other member for free rotation of the latter relative to said floating seal ring, said inner seal member having a plurality of circumferentially spaced passageways extending generally radially outwardly from the space between said wall portions, a spring ring mounted in said one member and having fingers yieldably engaging said inner seal member for maintaining the aforesaid parti-spherical surfaces in engagement, and a flinger ring mounted on said other member and extending into the space between said wall portions in labyrinth sealing relation to said floating seal ring.

7. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a sectional floating seal ring having inner and outer side walls and an interpositioned partition connected at their peripheries in axially spaced relationship, said outer side wall having a parti-spherical surface engaging said parti-spherical face and each side wall and the partition having a surface in closely spaced relation to the outer surface of said other member for free rotation of the latter relative to said floating seal ring, said seal ring having a plurality of circumferentially spaced passageways extending generally radially outwardly from the space between the inner side wall and the partition, resilient means engaging said seal ring for maintaining the aforesaid parti-spherical surfaces in engagement, and a pair of flinger rings mounted on said other member on opposite sides of said partition and extending into the spaces between said partition and said side walls in labyrinth sealing relation to said floating seal ring.

8. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a floating seal ring having a parti-spherical surface engaging said parti-spherical face, an internal surface in closely spaced relation to the outer surface of said other member and axially inwardly extending projections, a spring ring mounted in said one member and having fingers engaging said seal ring adjacent said projections for maintaining the aforesaid parti-spherical surfaces in engagement and for preventing rotation of said seal ring, and a flinger ring mounted on said other member in labyrinth sealing relation to said floating seal ring.

9. In a sealing device for closing the annular space between two relatively rotatable members supported for limited universal movement about a point on the axis of rotation, one of said members having an internal parti-spherical seal engaging face centered on the aforesaid point of universal movement in surrounding spaced relationship with the other of said members, a sectional floating seal ring having inner and outer side walls and an interpositioned partition connected at their peripheries in axially spaced relationship, said outer side wall having a parti-spherical surface engaging said parti-spherical face, said inner side wall having axially inwardly extending projections thereon, and each side wall and the partition having a surface in closely spaced relation to the outer surface of said other member, said seal ring having a plurality of circumferentially spaced passageways extending generally radially outwardly from the space between the inner side wall and the partition, a spring ring mounted in said one member and having fingers engaging said inner side wall adjacent its inwardly extending projections for maintaining the aforesaid parti-spherical surfaces in engagement and for preventing rotation of said seal ring, and a flinger ring mounted on said other member and extending into the space between said wall portions in labyrinth sealing relation to said floating seal ring.

10. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having an internal parti-spherical seal engaging face centered on the aforesaid point of universal movement in surrounding spaced relationship with said inner member and a pair of opposed radial surfaces forming a groove adjacent said parti-spherical face, a floating seal ring having a parti-spherical surface engaging said parti-spherical face and having an internal surface in closely spaced relation to the outer surface of said inner member for free rotation of the latter relative to said floating seal ring, a spring ring having a radially arranged marginal portion seated in said groove and having circumferentially spaced fingers engaging said floating seal ring for maintaining the aforesaid parti-spherical surfaces in engagement, and a flinger ring mounted on said inner member in labyrinth sealing relation to said floating seal ring.

11. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having an internal parti-spherical seal engaging face centered on the aforesaid point of universal movement in surrounding spaced relationship with said inner member and a pair of opposed conical surfaces forming a groove adjacent said parti-spherical face, a floating seal ring having a parti-spherical surface engaging said parti-spherical face and having an internal surface in closely spaced relation to the outer surface of said inner member for free rotation of the latter relative to said floating seal ring, a spring ring having outwardly converging marginal surfaces seated in said groove and having circumferentially spaced fingers engaging said floating seal ring for maintaining the aforesaid parti-spherical surfaces in engagement, and a flinger ring mounted on said inner member in labyrinth sealing relation to said floating seal ring.

12. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having an internal parti-spherical seal engaging face centered on the aforesaid point of universal movement in surrounding spaced relationship with said inner member and a pair of opposed conical surfaces forming a groove adjacent said parti-spherical face, a floating seal ring having a parti-spherical surface engaging said parti-spherical face, an internal surface in closely spaced relation to the outer surface of said inner member and axially inwardly extending projections, a spring ring having outwardly converging marginal surfaces seated in said groove and having circumferentially spaced fingers engaging said floating seal ring adjacent said projections for maintaining the aforesaid parti-spherical surfaces in engagement and for preventing rotation of said seal ring, and a flinger ring mounted on said inner member in labyrinth sealing relation to said floating seal ring.

13. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having an internal parti-spherical seal engaging face centered on the aforesaid point of universal movement in surrounding spaced relationship with said inner member and a pair of opposed conical surfaces forming a groove adjacent said parti-spherical face, a sectional floating seal ring having inner and outer side walls and an interpositioned partition connected at their peripheries in axially spaced relationship, said outer side wall having a parti-spherical surface engaging said parti-spherical face, said inner side wall having axially inwardly extending projections thereon, and each side wall and the partition having a surface in closely spaced relation to the outer surface of said inner member, a spring ring having outwardly converging marginal surfaces seated in said groove and having fingers engaging said inner side wall adjacent its inwardly extending projections for maintaining the aforesaid parti-spherical surfaces in engagement and for preventing rotation of said seal ring, and a flinger ring mounted on said inner member and extending into the space between said wall portions in labyrinth sealing relation to said floating seal ring.

14. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having a removable wall formed with an internal parti-spherical seal engaging face centered on the aforesaid point of universal movement in surrounding spaced relationship with said inner member, a floating seal ring having a parti-spherical surface engaging said parti-spherical face and having an internal surface in closely spaced relation to the outer surface of said inner member for free rotation of the latter relative to said floating seal ring, resilient means mounted on said removable wall and engaging said seal ring for maintaining the aforesaid parti-spherical surfaces in engagement, and a flinger ring mounted on said inner member in labyrinth sealing relation to said floating seal ring.

15. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having a removable wall formed with an internal parti-spherical seal engaging face centered on the aforesaid point of universal movement in surrounding spaced relationship with said inner member, a floating seal ring having a parti-spherical surface engaging said parti-spherical face, an internal surface in closely spaced relation to the outer surface of said inner member and axially inwardly extending projections, resilient means mounted on said removable wall and engaging said seal ring adjacent said projections for maintaining the aforesaid parti-spherical surfaces in engagement and for preventing rotation of said seal ring, and a flinger ring mounted on said inner member in labyrinth sealing relation to said floating seal ring.

16. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having a removable wall formed with an internal parti-spherical seal engaging face centered on the aforesaid point of universal movement in surrounding spaced relationship with said inner member, a sectional floating seal ring having inner and outer side walls and an interpositioned partition connected at their peripheries in axially spaced relationship, said outer side wall having a parti-spherical surface engaging said parti-spherical face and each side wall and the partition having a surface in closely spaced relation to the outer surface of said inner member for free rotation of the latter relative to said floating seal ring, resilient means mounted on said removable wall and engaging said seal ring for maintaining the aforesaid parti-spherical surfaces in engagement, and a pair of flinger rings mounted on said inner member on opposite sides of said partition and extending into the spaces between said partition and said side walls in labyrinth sealing relation to said floating seal ring.

17. In a sealing device for closing the annular space between concentrically arranged inner and outer members supported for relative rotation therebetween and for limited universal movement about a point on the axis of rotation, said outer member being sectional and separable on a plane passing diametrically through said annular space and the aforesaid point and having a removable wall formed with an internal parti-spherical seal engaging face centered on the aforesaid point of universal movement in surrounding spaced relationship with said inner member, a sectional floating seal ring having inner and outer side walls and an interpositioned partition connected at their peripheries in axially spaced relationship, said outer side wall having a parti-spherical surface engaging said parti-spherical face, said inner side wall having axially inwardly extending projections thereon, and each side wall and the partition having a surface in closely spaced relation to the outer surface of said inner member, a spring ring mounted on said removable wall and having fingers engaging said inner side wall adjacent its inwardly extending projections for maintaining the aforesaid parti-spherical surfaces in engagement and for preventing rotation of said seal ring, and a flinger ring mounted on said inner member and extending into the space between said wall portions in labyrinth sealing relation to said floating seal ring.

18. In a sealing device for closing the annular space between concentrically arranged inner and outer members supported for relative rotation therebetween and for limited universal movement about a point on the axis of rotation, said outer member being chambered and having opposed integral and removable walls each provided with an internal parti-spherical seal engaging face centered on the aforesaid point of universal movement in surrounding spaced relationship with said inner member, a pair of floating seal rings each having a parti-spherical surface engaging the parti-spherical face of a different one of said walls and having an internal surface in closely spaced relation to the outer surface of said inner member for free rotation of the latter relative to said floating seal ring, resilient means clamped against the inner sides of said walls and yieldably engaging said seal rings for maintaining the aforesaid parti-spherical surfaces in engagement, and a flinger ring mounted on said inner member in labyrinth sealing relation to said floating seal ring.

19. In a sealing device for closing the annular space between concentrically arranged inner and outer members supported for relative rotation therebetween and for limited universal movement about a point on the axis of rotation, said outer member being chambered and having opposed integral and removable walls each provided with an internal parti-spherical seal engaging face centered on the aforesaid point of universal movement in surrounding spaced relationship with said inner member, a pair of floating seal rings each having a parti-spherical surface engaging the parti-spherical face of a different one of said walls, an internal surface in closely spaced relation to the outer surface of said inner member and axially inwardly extending projections, a pair of spring rings each having its marginal portion clamped against the inner side of a different one of said walls and having fingers engaging the seal ring associated with the wall adjacent the axially extending projections of the ring for maintaining the aforesaid parti-spherical surfaces in engagement and for preventing rotation of said seal ring, and flinger rings mounted on said inner member in labyrinth sealing relation to said floating seal rings.

20. In a sealing device for closing the annular space between concentrically arranged inner and outer members supported for relative rotation therebetween and for limited universal movement about a point on the axis of rotation, said outer member being chambered and having opposed integral and removable walls each provided with an internal parti-spherical seal engaging face centered on the aforesaid point of universal movement in surrounding spaced relationship with said inner member, a pair of sectional floating seal rings each associated with a different one of said walls and having inner and outer side walls and an interpositioned partition connected at their peripheries in axially spaced relationship, said outer side wall having a parti-spherical surface engaging the parti-spherical face of the associated wall, said inner side wall having axially inwardly extending projections thereon, and each side wall and the partition having a surface in closely spaced relation to the outer surface of said inner member, a pair of spring rings each having its marginal portion clamped against the inner side of a different one of said walls and having fingers engaging the inner side wall of the associated seal ring adjacent the inwardly extending projections on the inner side wall for maintaining the aforesaid parti-spherical surfaces in engagement and for preventing rotation of said seal ring, and a flinger ring mounted on said inner member and extending into the space between said wall portions in labyrinth sealing relation to said floating seal ring.

References Cited in the file of this patent

UNITED STATES PATENTS

| | | |
|---|---|---|
| 1,094,312 | Delmez | Apr. 21, 1914 |
| 1,461,236 | Webb | July 10, 1923 |
| 1,975,170 | Olson | Oct. 2, 1934 |
| 2,132,838 | Weckstein | Oct. 11, 1938 |
| 2,277,810 | Zotter | Mar. 31, 1942 |
| 2,286,472 | Delaval-Crow | June 16, 1942 |
| 2,311,279 | Parks | Feb. 16, 1943 |
| 2,486,123 | Cottrell | Oct. 25, 1949 |

FOREIGN PATENTS

| | | |
|---|---|---|
| 645,370 | France | June 26, 1928 |